(12) United States Patent
Heiskala

(10) Patent No.: US 7,668,268 B2
(45) Date of Patent: Feb. 23, 2010

(54) LOWER COMPLEXITY COMPUTATION OF LATTICE REDUCTION

(75) Inventor: Juha Heiskala, Helsinki (FI)

(73) Assignee: Nokia Corporation, Espoo (FI)

( * ) Notice: Subject to any disclaimer, the term of this patent is extended or adjusted under 35 U.S.C. 154(b) by 610 days.

(21) Appl. No.: 11/439,040

(22) Filed: May 22, 2006

(65) Prior Publication Data

US 2007/0268981 A1  Nov. 22, 2007

(51) Int. Cl.
*H03D 1/06* (2006.01)
(52) U.S. Cl. ..................................... 375/348
(58) Field of Classification Search ................. 375/260, 375/262, 265, 267, 340–342, 346, 349; 455/132, 455/137; 370/334, 350
See application file for complete search history.

(56) References Cited

U.S. PATENT DOCUMENTS

| | | | |
|---|---|---|---|
| 6,724,843 B1 | 4/2004 | Clarkson et al. | 375/347 |
| 2005/0175122 A1 | 8/2005 | Nefedov et al. | 375/323 |
| 2005/0281350 A1* | 12/2005 | Chae et al. | 375/267 |
| 2006/0176971 A1* | 8/2006 | Nissani (Nissensohn) | 375/267 |
| 2006/0245513 A1* | 11/2006 | Koo et al. | 375/267 |
| 2006/0256888 A1* | 11/2006 | Nissani (Nissensohn) | 375/267 |
| 2007/0230628 A1 | 10/2007 | You et al. | 375/340 |

FOREIGN PATENT DOCUMENTS

GB  2429884 A  3/2007

OTHER PUBLICATIONS

Wen, Xue Wen et al., "LLL Lattice Reduction-Based Detection of Joint VBLAST and SFBC in MIMO/OFDM Systems", International Conference on May 27-30, 2005, pp. 194-198, vol. 1, Communications, Circuits and Systems.
"Factoring Polynomials with Rational Coefficients", A.K. Lenstra et al., Math Ann 261, 1982, pp. 515-534.
"MMSE-Based Lattice-Reduction for Near-ML Detection of MIMO Systems", Dirk Wiibben et al., IEEE 2004, pp. 106-113.
"Near-Maximum-Likelihood Detection of MIMO Systems using MMSE-Based Lattice-Reduction", Dirk Wiibben, et al., EEE Communications Society, 2004, pp. 798-802.
"Closest Point Search in Lattices", Erik Agrell, et al., IEEE 2002, pp. 2201-2214.
"On Maximum-Likelihood Detection and the Search for the Closest Lattice Point", Mohamed Oussama Damen, et al., IEEE 2003, pp. 2389-2402.

(Continued)

*Primary Examiner*—Khanh C Tran
(74) *Attorney, Agent, or Firm*—Harrington & Smith PC

(57) ABSTRACT

A signal vector is received over a plurality of channels. A channel matrix H is determined that represents at least one of the plurality of channels. An iterative algorithm such as Lenstra-Lenstra-Lovasz is used to determining a change of basis matrix T that when multiplied with the channel matrix H converges to a matrix H*T that is more orthogonal than the channel matrix H. In one aspect the iterative algorithm is upwardly bounded in the number of iterations (e.g., 20 or 30 iterations) that it may perform for any specific channel realization to determine the change of basis matrix T. In another aspect the algorithm is initiated with a matrix derived from a previously determined change of basis matrix. Both aspects may be combined in a single method or device, or either employed separately.

18 Claims, 7 Drawing Sheets

OTHER PUBLICATIONS

"Lattice Basis Reduction: Improved Practical Algorithms and Solving Subset Sum Problems", C.P. Schnorr et al., Universitat Frankfurt, Jul. 1993, pp. 1-27.

"Improved Methods for Calculating Vectors of Short Length in a Lattice, Including a Complexity Analysis", U. Fincke et al., Mathematics of Computation, vol. 44, No. 170, Apr. 1985, pp. 463-471.

* cited by examiner

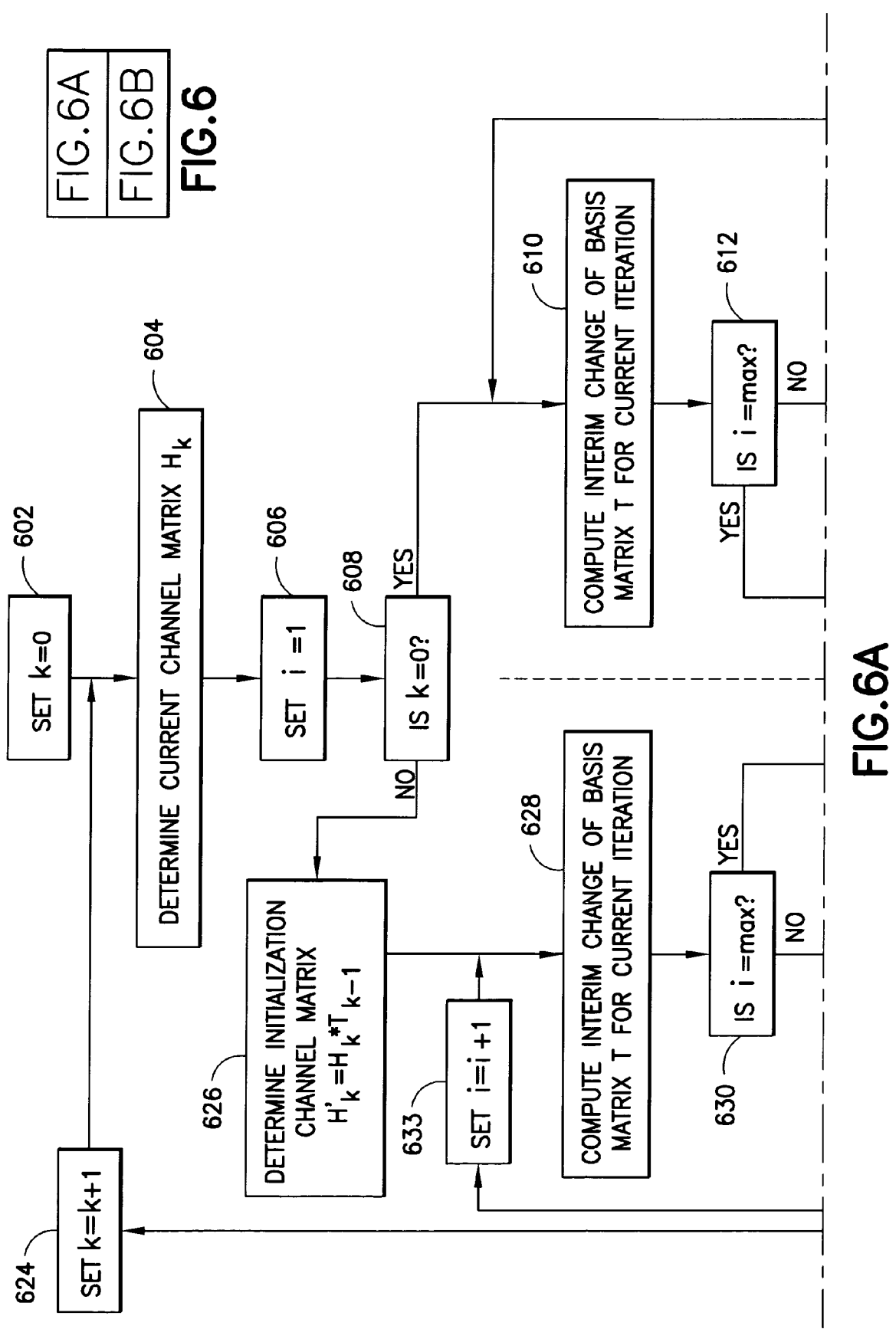

LOWER COMPLEXITY COMPUTATION OF LATTICE REDUCTION

TECHNICAL FIELD

The teachings detailed herein relate to signal detection in a wireless system using a reduced lattice basis to detect the transmitted signal, and is particularly advantageous for detecting transmissions in a multiple-input/multiple output MIMO communication system.

BACKGROUND

While MIMO systems offer the possibility of increasing data throughput without increasing bandwidth, the fact that a signal is sent via multiple antennas and/or received at multiple antennas make signal detection computationally complex as compared to systems employing a single transmit and single receive antenna. Specifically, the transmitted signal x is subject to interference and noise while moving through the wireless channel. The received signal y is detected and its value is determined by removing channel influences so as to resolve the best estimate of what the transmitted signal x was. Algebraically, y=Hx+n, where H is the channel matrix and n is noise. Channel influences are determined from measured or estimated parameters of the channel to determine the channel matrix H. In a single antenna system (one transmit and one receive antenna), there is one channel between them (neglecting multi-path detection) and H is one row. Where the received signal y is received over multiple channels such as when sent from multiple transmit antennas and/or received at multiple receive antennas, the channel is more than additive as H expands in rows and columns, so the corresponding computations involved to determine and remove influences from those multiple channels from that same single signal increases non-linearly with the number of antennas. To resolve the received signal y in a MIMO system, with the same confidence level (bit error rate) as for a single channel, a complex and iterative process many times more demanding than the baseline single channel scenario is employed. In that wireless systems use portable transceivers with a limited power supply and reduced/slower computational capacity as compared to larger, fixed and AC-powered base station transceivers, the theory of increased MIMO data rates is somewhat frustrated by these practical limitations of the mobile equipment that would most likely benefit from it.

Consider one prior art technique that may be used for MIMO signal detection, shown in FIG. 1, taken from FIG. 3a of U.S. Pub. No. 2005/0175122 A1, by Nikolai Nefedov et al.). As detailed in that publication, FIG. 3a illustrates a simplified flowchart of a sphere decoder signal detection method, and for simplicity assumes the same number of transmit and receive antennas $N_t$. A counter i is initialized 301 and the transmitted symbol $x_i$ is determined 302 in a reduced complexity sphere decoder by taking into account its modulation 302a and a priori reliability information concerning the transmitted symbol $x_i$ 302b. The sphere decoder is reduced complexity because it does not search the entire signal constellation or lattice but only a spherical subset thereof to resolve the symbol $x_i$. The modulation scheme typically affects the area of the sphere in which the sphere decoder searches for the value of the symbol $x_i$. The a priori information may be obtained from a channel decoder or error detector operating on the present symbol $x_i$, from a previously detected symbol, or from an external source such as a channel decoder or error detector of another user or service. The determined symbol $x_i$ remains a soft value until all symbols $x_i$ are determined, in which case they are assembled into a vector x and output 305 as a hard output for which reliability information is determined 306.

The Nefedov publication describes that in estimating $x_i$, upper and lower bounds to the estimated symbol $x_i$ as set forth in Eqs. 6-8 are recursively and iteratively updated by Eq. 9 until either a value of $x_i$ is determined or the search for $x_i$ begins again with a different initial parameter of $x_{i-1}$. One can see that this may be a computationally intensive undertaking. Where the received symbols are voice, symbol decoding must be done in real time or nearly so. Where the received symbols are large data files (e.g., video or image data), symbol decoding need not be in the chronological order transmitted but there is typically a much larger volume of symbols to detect.

Apart from Nefedov's searching within a limited sphere that is less than the entire signal constellation, lattice reduction is one way to reduce this computational intensity. Specifically, lattice reduction in a MIMO detection system calculates a change of a basis matrix T for the channel H, such that H*T is closer to an orthogonal matrix than H. The change of basis matrix T is a unimodular integer matrix, meaning that its elements are only integers and its determinant $\text{DET}(T) = \pm 1$. The MIMO symbol detection can then be performed by operating with H*T and $T^{-1}x$, instead of H and x, where x is the transmitted symbol vector. The near orthogonality property of H*T results in relatively small noise enhancement with linear detection techniques (Zero Forcing, Minimum Mean Square Error), and so good detection performance is maintained. Lattice reduction can also be used to improve the performance of low complexity non-linear MIMO detectors such as Serial Interference Cancellation (SIC) detectors.

One way to calculate the change of basis matrix T is with the Lenstra-Lenstra-Lovasz (LLL) algorithm. The LLL algorithm is particularly detailed in a paper entitled FACTORING POLYNOMIALS WITH RATIONAL COEFFICIENTS by A. K. Lenstra, H. W. Lenstra and L Lovasz, in Math Ann 261, 515-534 (1982), hereby incorporated by reference. The LLL algorithm is widely used in the wireless communication arts, but under certain conditions it too might impose a high computational burden.

What is needed in the art is a symbol detection method and apparatus that operates with reduced complexity as compared to the prior art so as to be viable for power consumption, computational capacity, and time to resolve the received symbols in mobile platforms operating in a MIMO system.

SUMMARY

The foregoing and other problems are overcome, and other advantages are realized, in accordance with the presently described embodiments of these teachings.

In accordance with an exemplary embodiment of the invention, there is provided an a method for detecting a signal. First, a signal vector is received over a plurality of channels. A channel matrix H is determined that represents at least one of the plurality of channels. Using an iterative algorithm, a change of basis matrix T is determined that, when multiplied with the channel matrix H, converges to a matrix H*T that is more orthogonal than the channel matrix H. The iterative algorithm is upwardly bounded in a number of iterations by a predetermined maximum value. The channel matrix H and the change of basis matrix T are used to detect the received signal vector.

In accordance with another exemplary embodiment of the invention, there is provided a program of machine-readable instructions, tangibly embodied on an information bearing medium and executable by a digital data processor, to perform actions directed toward determining a change of basis matrix T for use in decoding a received signal. The actions include receiving a signal vector over a plurality of channels, determining a channel matrix H that represents at least one of the plurality of channels, and then using an iterative algorithm, determining a change of basis matrix T that when multiplied with the channel matrix H converges to a matrix H*T that is more orthogonal than the channel matrix H. The iterative algorithm is upwardly bounded in a number of iterations by a predetermined maximum value.

In accordance with another exemplary embodiment of the invention, there is provided a receiver that includes a plurality of receive antenna ports, a channel estimator, a matrix generator, a register, a memory, and a processor. The channel estimator has an input coupled to an output of each of the plurality of receive antenna ports, and an input coupled to the processor and is adapted to determine a channel matrix H for a channel realization. The matrix generator has an input coupled to an output of the channel estimator, and is adapted to determine according to an iterative algorithm a change of basis matrix T that when multiplied with the channel matrix H converges to a matrix H*T that is more orthogonal than the channel matrix H. This simplifies detection. The register is coupled to the matrix generator and is adapted to store an upward bound to the number of iterations the algorithm may perform. The memory is adapted to store the iterative algorithm. The processor terminates further iterations of the algorithm for a current channel realization once the upward bound is reached.

In accordance with another exemplary embodiment of the invention, there is provided a method for detecting a signal. In this method, a signal vector is received over a plurality of channels. For a first channel realization, a first channel matrix $H_1$ is determined that represents at least one of the plurality of channels. An iterative algorithm is used to determine a first change of basis matrix $T_1$ that when multiplied with the first channel matrix $H_1$ converges to a first combined matrix $H_1*T_1$ that is more orthogonal than the first channel matrix $H_1$. For a second channel realization, a second channel matrix $H_2$ is determined that represents at least one of the plurality of channels. The iterative algorithm is initialized with a matrix derived from the first change of basis matrix $T_1$, and the initialized iterative algorithm is used to determine a second change of basis matrix $T_2$ that when multiplied with the second channel matrix $H_2$ converges to a second combined matrix $H_2*T_2$ that is more orthogonal than the second channel matrix $H_2$. The second channel matrix $H_2$ and the second change of basis matrix $T_2$ are used to detect a signal received in the second channel realization.

In accordance with another exemplary embodiment of the invention, there is provided a program of machine-readable instructions, tangibly embodied on an information bearing medium and executable by a digital data processor, to perform actions directed toward determining a change of basis matrix T for use in decoding a received signal. The actions include receiving a signal vector over a plurality of channels, for a first channel realization, determining a first channel matrix $H_1$ that represents at least one of the plurality of channels, and using an iterative algorithm to determine a first change of basis matrix $T_1$ that when multiplied with the first channel matrix $H_1$ converges to a first combined matrix $H_1*T_1$ that is more orthogonal than the first channel matrix $H_1$. Further, the actions continue in that, for a second channel realization, a second channel matrix $H_2$ is determined that represents at least one of the plurality of channels. The iterative algorithm is initialized with a matrix derived from the first change of basis matrix $T_1$, and the initialized iterative algorithm is used to determine a second change of basis matrix $T_2$ that when multiplied with the second channel matrix $H_2$ converges to a second combined matrix $H_2*T_2$ that is more orthogonal than the second channel matrix $H_2$. The second channel matrix $H_2$ and the second change of basis matrix $T_2$ are used to detect a signal received in the second channel realization.

In accordance with another exemplary embodiment of the invention, there is provided a receiver that includes a plurality of receive antenna ports, a channel estimator, a processor and a matrix generator. The channel estimator has an input coupled to an output of each of the plurality of receive antenna ports and an input coupled to the processor and is adapted to determine a first channel matrix $H_1$ for a first channel realization and a second channel matrix $H_2$ for a second channel realization. The matrix generator has an input coupled to an output of the channel estimator and is adapted to determine, according to an iterative algorithm, a first change of basis matrix $T_1$ for a first channel realization that when multiplied with the first channel matrix $H_1$ converges to a first combined matrix $H_1*T_1$ that is more orthogonal than the first channel matrix $H_1$. The matrix generator is also adapted to determine, according to the iterative algorithm as initialized with a matrix deriving from the first change of basis matrix $T_1$, a second change of basis matrix $T_2$ for the second channel realization that when multiplied with the second channel matrix $H_2$ converges to a second combined matrix $H_2*T_2$ that is more orthogonal than the second channel matrix $H_2$.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

Figure 1:
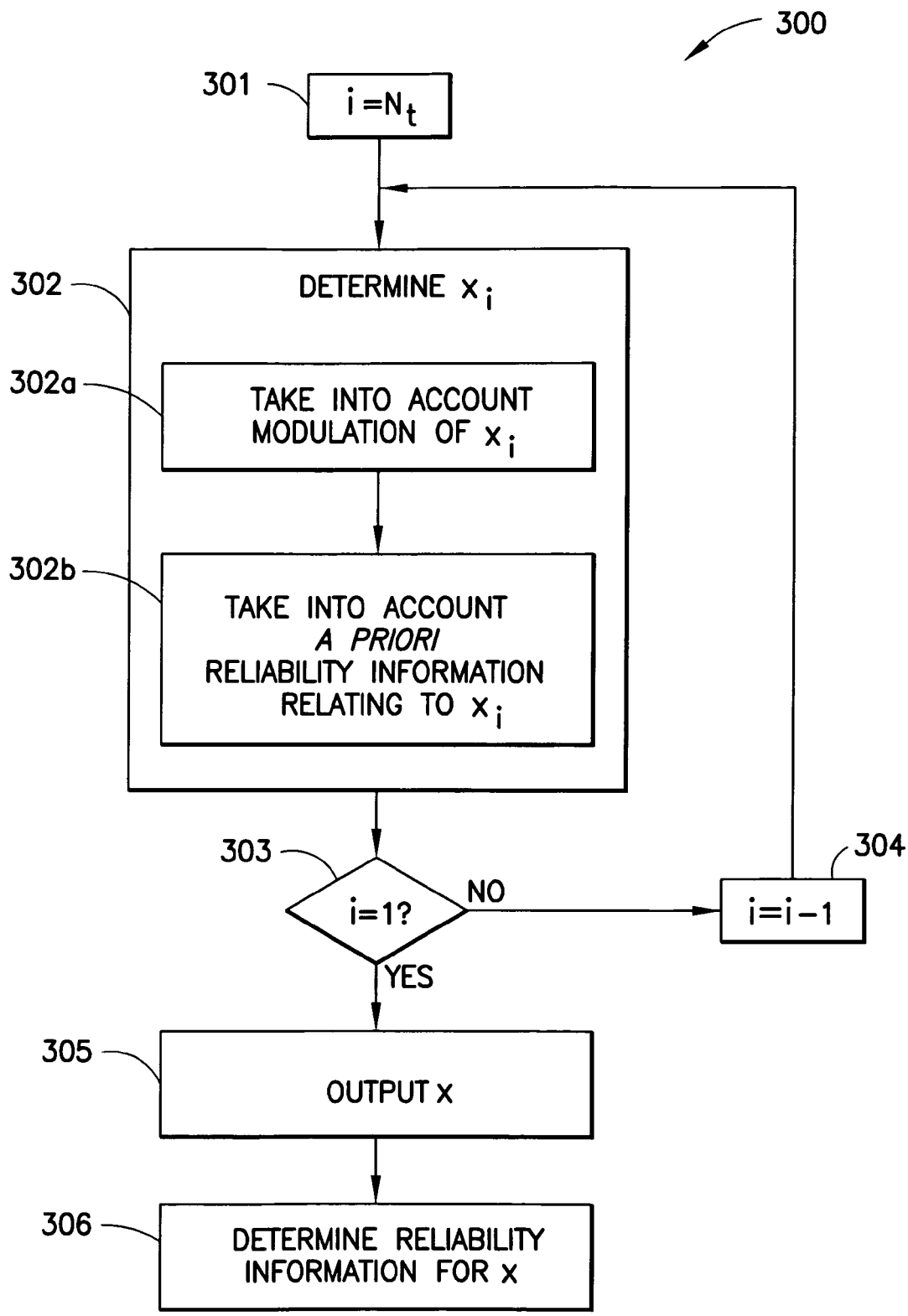
FIG. 1 is a prior art simplified flowchart of a Sphere Decoder for signal detection taken from FIG. 3a of U.S. Pub. No. 2005/0175122 A1.
Figure 2:
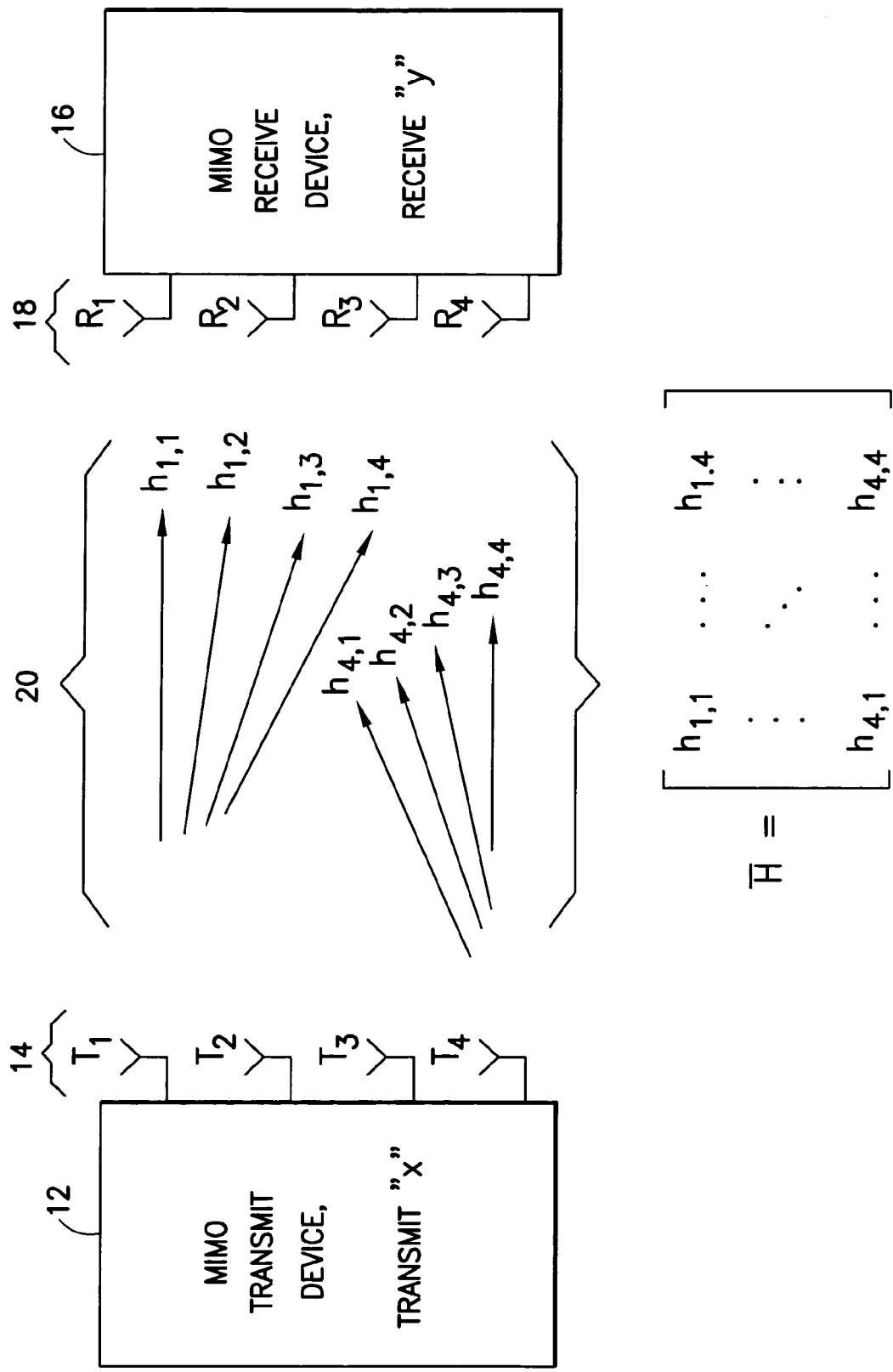
FIG. 2 is a schematic diagram of a MIMO system that includes a MIMO transmit device and a MIMO receive device, each with four operational antennas communicating over a channel characterized by the matrix H.

A generalized MIMO communication system 10 is shown in a simplified schematic form in FIG. 2, where a transmit device 12 such as a base transceiver station of a mobile telephony network transmits a symbol vector $x=\{x_0, x_1, x_2, \ldots x_i\}$ from each of four transmit antennas 14 (labeled $T_1$ through $T_4$), and a receive device 16 such as a mobile station receives the transmitted symbol vector as $y=\{y_0, y_1, y_2, \ldots y_i\}$ over the MIMO channel 20. The channel 20 is characterized by the channel matrix H. Each sub-channel from one transmit antenna 14 to one receive antenna 18 is represented as one element $h_{t,r}$ of the channel matrix, with subscripts indicating the path from transmit to receive antenna, so that for the four transmit antennas 14 and four receive antennas 18 illustrated in FIG. 2, the channel matrix is $$H = \begin{Bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{Bmatrix}.$$

Note that in FIG. 2, only the sub-channels from transmit antennas 1 and 4 are shown, to avoid clutter. Where multipath effects are included, further elements h are present in the channel matrix. The signal vector received at the array of receive antennas 18 at the receive device 14 is then represented as y=Hx+n, where n is an additive (Gaussian) noise vector. Where the system 10 is a time division multiple access system, the channel matrix H may represent multiple paths along which the symbol vector x passes enroute to a receive antenna. In a code division multiple access system, elements of the symbol vector x represent a symbol spread with a particular code.

As above, one way to reduce complexity in the receive device for detecting the symbol vector y is to use an LLL algorithm or other technique to convert the matrix H to a matrix that is more orthogonal. In general, a real orthogonal matrix is a square matrix Q whose transpose is its inverse. Algebraically, this may be written as $Q^T Q = QQ^T = I$, or as $Q^T = Q^{-1}$ (where the superscript T represents a matrix transpose and I is the identity matrix). Any purposeful conversion of the matrix H to one that is closer to this orthogonal ideal is a conversion to a more orthogonal matrix. The LLL algorithm computes what is termed a change of basis matrix T (which may be adjusted with an integer change) and multiplies it by the channel matrix H to yield a more orthogonal matrix H*T. Generally, each successive iteration of the LLL algorithm purposefully converges the combined matrix H*T for that iteration closer towards the ideal of orthogonality, as compared to the last iteration (or as compared to the original matrix H in the case of the first iteration). While occasionally one or two iterations might yield a less orthogonal matrix than the previous iteration, the trend over several iterations is toward orthogonality. The inventor recognized that in the prior art, some of the problems in utilizing the LLL algorithm to reduce complexity by means of calculating the change of basis matrix T is that the complexity of the LLL algorithm to compute that change of basis matrix itself depends on its input. Because the maximum possible time required for computing the change of basis matrix T is not known in advance, then to implement a receiver that operates with a LLL algorithm requires designing that receiver for the worst case scenario in which the LLL algorithm runs through a very high number of iterations before converging on a solution. Even though in practice the LLL algorithm might require such a software/hardware commitment only occasionally, the variable computing time complicates the design of the receiver, especially when one considers time limitations to detecting voice and/or high volume data as above for which a designer in the prior art assumed that the LLL algorithm might require a very high number of iterations.

Calculation of the change of basis matrix T is the most computationally demanding step of the lattice reduction based MIMO detection. Therefore lowering the complexity of the lattice reduction step, i.e. calculation of the change of basis matrix T, can significantly reduce the complexity of the overall lattice reduction based MIMO detection. Embodiments of the invention solves this problem by limiting the computational complexity of the LLL algorithm to a known amount. Specifically, the LLL algorithm operates iteratively, and the number of iterations varies depending on the input to the algorithm. In one exemplary embodiment, the use of this invention limits the number of iterations that the LLL algorithm performs to some maximum amount (e.g., twenty or thirty iterations). This maximum amount is determined as a compromise between the desired maximum computational complexity and the performance loss caused by terminating the LLL-algorithm prematurely.

Figure 4:
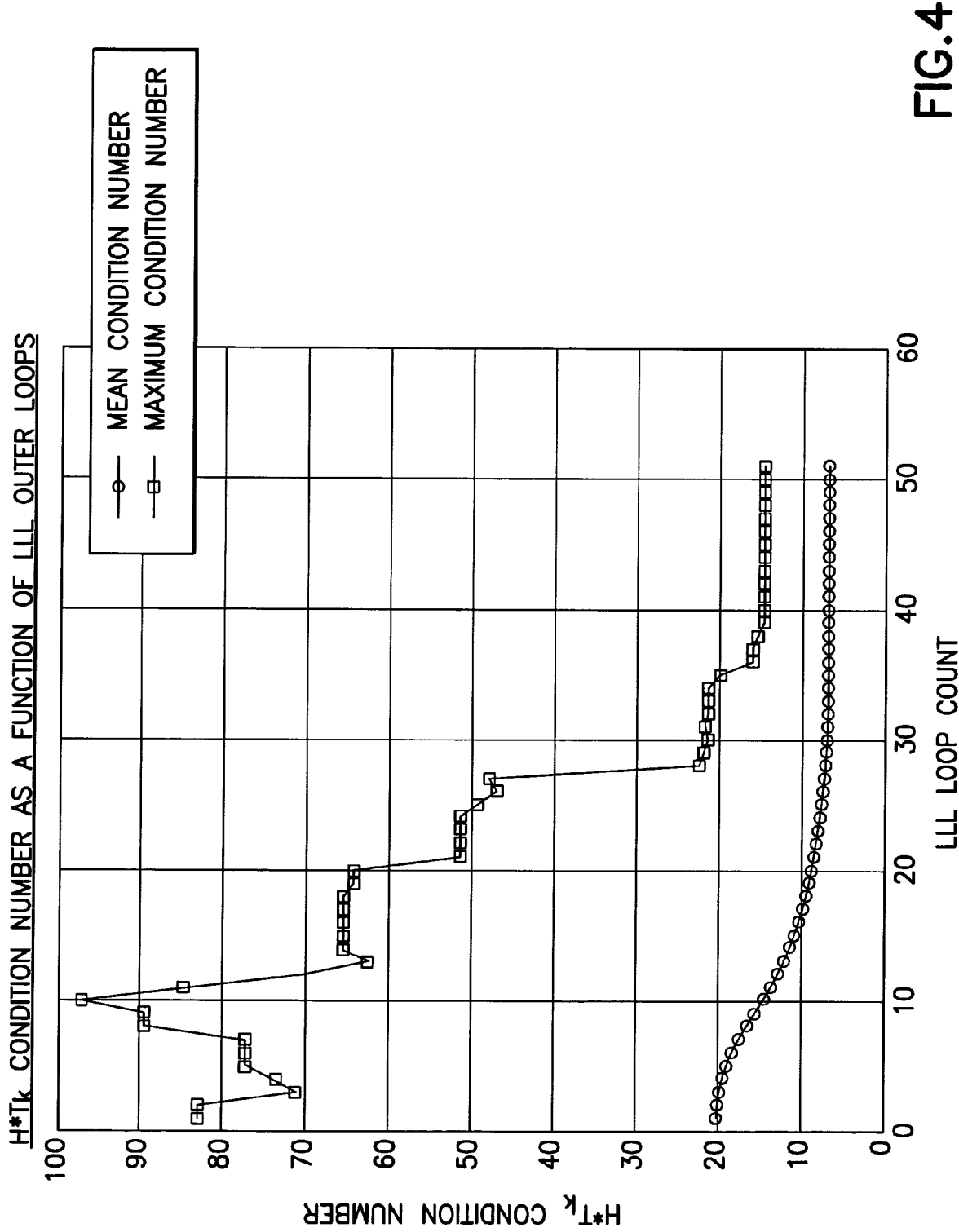
FIG. 4 is a graph of condition number versus LLL outer algorithm loop count showing mean condition number and maximum condition number for an 8×8 MIMO system.
Figure 5:
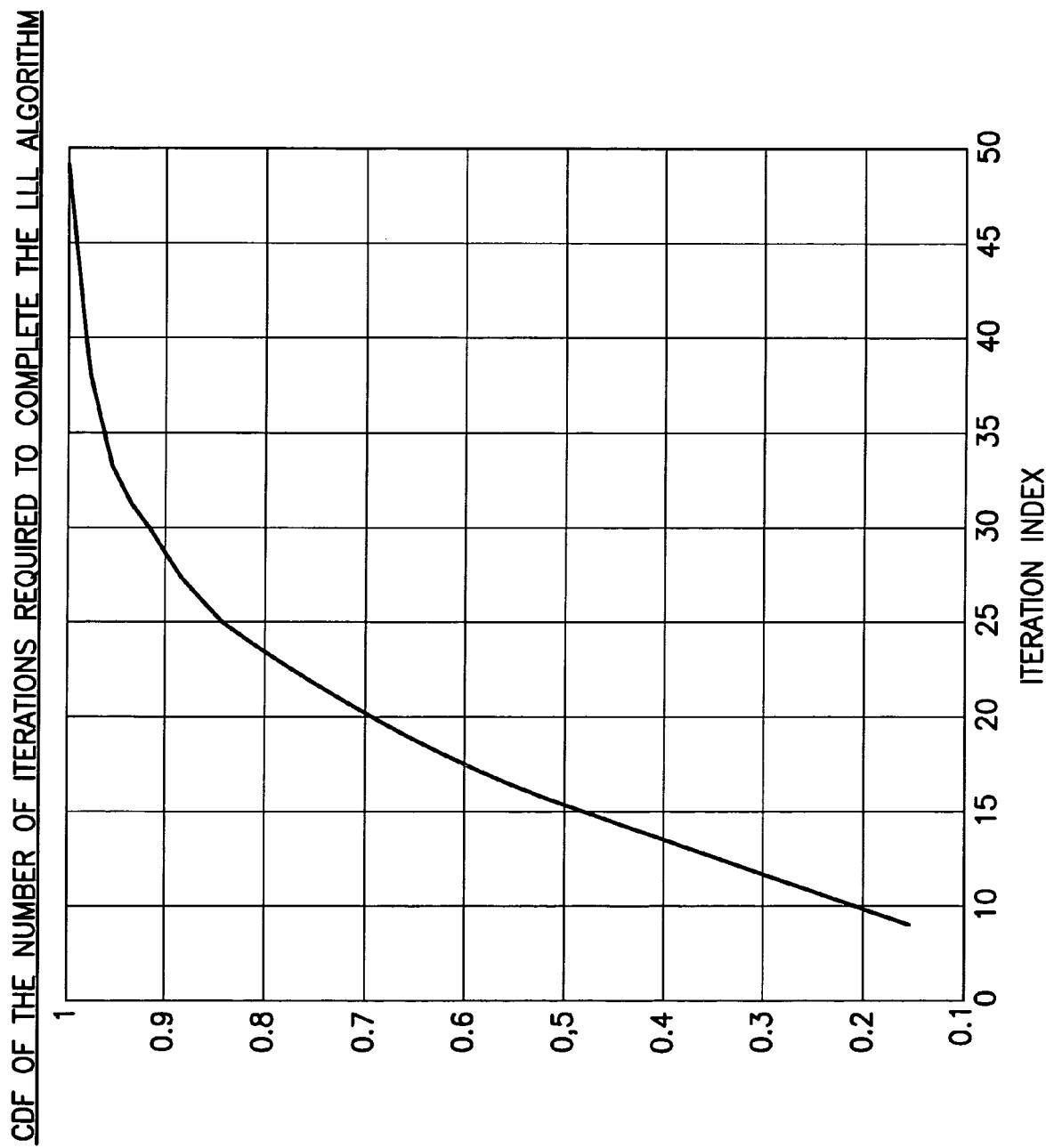
FIG. 5 is a graph of CDF versus iterations in a Lenstra-Lenstra-Lovasz algorithm.

FIG. 4 illustrates in graphical form a set of simulation results, for a MIMO system 10 using eight transmit and eight receive antennas, showing the mean and maximum condition number (vertical axis) of $H^*T_k$ as a function of an iteration index (horizontal axis) of the LLL-algorithm. The subscript k is used to indicate a time instant or frequency subcarrier for which the calculated change of basis matrix $T_k$ is valid, for example in an OFDM system. The channel matrix H is valid for some coherence interval that depends from the channel itself, which may span multiple packets or symbol vectors. Where the change of basis matrix is for a sub-channel, the subscript k may indicate that the change of basis matrix is valid for the coherence interval of that sub-channel. The simulations of FIGS. 4-5 are for 1000 channel realizations. The condition number of $H^*T_k$ serves as an indicator of the performance of the lattice reduction aided MIMO detection, as noise enhancement is related to the condition number. The smaller the condition number is, the better the performance with low-complexity detection methods. FIG. 4 shows that the mean condition number is close to its minimum value after about twenty iterations, as compared to over fifty iterations required to complete the LLL-algorithm for all the simulated channels. The twenty iterations is also close the average of nineteen iterations required to complete the LLL-algorithm for this set of simulated data.

FIG. 5 illustrates in graphical form the cumulative distribution function (CDF) of the number of iterations required to complete the LLL-algorithm. After twenty iterations, FIG. 5 shows that the LLL-algorithm has completed for almost 70% of channel realizations. Referring again to FIG. 4, after twenty iterations the maximum condition number of $H^*T_k$ has decreased to about half from the maximum condition number encountered during the LLL-algorithm. The substantial drop in condition number at about 28 iterations (FIG. 4) makes clear that approximately thirty iterations are required to limit the maximum condition number near its minimum value. The lesser drop in condition number between thirty and forty iterations is beyond the point of diminishing returns, which FIG. 5 illustrates more clearly (about 22% of channel realizations between 20 and 30 iterations, but only about 8% of channel iterations between 30 and 40 iterations).

While the above description computes the change of basis matrix using the LLL algorithm, embodiments of this invention and the teachings herein can also be applied to any lattice reduction algorithm that operates iteratively, and that generally converges towards the final solution at each iteration step. Currently it appears that the LLL algorithm is used most widely, but also the Korkin-Zolotarev lattice reduction algorithm may be adapted with the aspects of the invention described herein. Further details on these algorithms and others may be found in a paper entitled LATTICE BASIS REDUCTION: IMPROVED PRACTICAL ALGORITHMS AND SOLVING SUBSET SUM PROBLEMS, by C. P. Schnorr and M. Euchner (July 1993).

Whether for an LLL algorithm or another iterative converging algorithm, implementation requires counting the number of iterations performed and then checking the count against the limit. If the maximum limit is reached, further iterations of the algorithm are terminated and the result after the final iteration is accepted. While not as accurate as running all iterations of the algorithm, this is seen as a reasonable tradeoff for predictability in the algorithm time and computational load so s to more efficiently design other components of the receiver (e.g., RAM memory, processor power, battery size, etc.). For those instances where the algorithm converges to a solution before reaching the maximum number of iterations, no accuracy is lost. While in those instances where the algorithm terminates prior to converging fully on a solution some performance is lost as compared to the prior art, the advantage of knowing in advance the maximum computational effort/time for computing the change of basis matrix $T_k$ is seen to more than offset that loss of performance.

Maximally limiting the number of iterations for the converging algorithm applies to the end of the calculation of the change of basis matrix $T_k$. While that technique is valuable in and of itself, efficiencies may also be gained at the starting point of the algorithm, as detailed below.

The teachings below may be exploited whenever the channel for which the change of basis matrix T is calculated exhibit correlation. Typically, correlation will be over time and/or frequency. In another aspect of the invention, a correlation property of the channel is used to initialize the calculation of the reduced lattice basis. Whereas the prior art begins the calculation of T independently of previous calculations of the change of basis matrix T each time it needs to be computed (e.g., for each time instant or frequency subcarrier), this aspect of the invention begins the algorithm for computing the current change of basis matrix $T_k$ with a previously calculated change of basis matrix $T_{k-1}$ such that the reduced basis is easier to compute than without the initialization. That previously calculated change of basis matrix $T_{k-1}$ may be for the same subchannel calculated at a previous time, or may be for a closely aligned subchannel calculated immediately prior to (or even partially in parallel with) the current computation of the current change of basis matrix $T_k$. This initialization of the algorithm uses a previously calculated lattice reduction as its starting point, resulting in a substantial decrease of the average complexity of calculating the reduced lattice basis for the current channel realization.

The combination of both initializing the algorithm with a previously calculated lattice reduction and truncating iterations of the algorithm after a predetermined maximum number are mutually beneficial to system performance. Operation of the former reduces the number of instances in which a full algorithm convergence would otherwise exceed the maximum number of algorithm iterations, so both aspects of the invention combined are synergistic. For example, if a specific selected maximum number of iterations would result in 10% of change of basis matrix calculations being truncated when no initialization is used, then initializing the algorithm with a previously computed change of basis matrix should reduce that 10% induced error factor (where less than full convergence implies error) to some lower figure in nearly all instances.

Consider a MIMO communications system 10 with two channel realizations $H_k$ and $H_{k+1}$, where the index k can refer to a time instant or frequency subcarrier in for example an OFDM system. These two channels $H_k$ and $H_{k+1}$ are often quite similar, but not exactly the same. The prior art lattice reduction MIMO detectors calculate the lattice reduction individually for both $H_k$ and $H_{k+1}$, and independently of one another. The individual lattice reduction calculations output the change of basis matrices $T_k$ and $T_{k+1}$. This aspect of the invention results in a lower complexity calculation of $T_{k+1}$ by exploiting the similarity of $H_k$ and $H_{k+1}$.

As would be expected, the first channel realization at a first time instant cannot take advantage of the algorithm initialization aspect described above. For all other channel realizations, the input to the lattice reduction algorithm for the second time instant is a matrix derived from the first channel realization, whenever the channel realizations exhibit correlation. There are several ways to implement this algorithm initialization: the prior channel matrix may be used directly, the prior change of basis matrix may be used directly, or some hybrid thereof. In one exemplary implementation, what is termed an initialization channel matrix $H'_{k+1}=H_{k+1}*T_k$ is used to initialize the algorithm for the next channel realization, which as shown is the current channel matrix $H_{k+1}$ multiplied by the previous change of basis matrix $T_k$. The initialization channel matrix $H'_{k+1}$ is often nearly reduced due to the correlation between the previous channel matrix $H_k$ and the current channel matrix $H_{k+1}$, hence the complexity of the lattice reduction calculation is usually significantly lower than using the prior art input $H_{k+1}$. The lattice reduction of the initialization channel matrix $H'_{k+1}$ then outputs a change of basis matrix $T'_{k+1}$, from which is computed the overall change of basis matrix $T_{k+1}=T'_{k+1}*T_k$.

Table 1 below shows a comparison of computational load between prior art lattice reduction where each channel realization is computed independently, and lattice reduction according to the algorithm initialization using the initialization channel matrix $H'_{k+1}$ and the change of basis matrix $T'_{k+1}$ detailed above. The results are for 100 simulated channel realizations of an OFDM system with FTT size equal to 512. The channel realizations are independent. The prior art lattice reduction is calculated individually for each OFDM subcarrier $H_k$ and the initialized lattice reduction initializes each lattice reduction with $H_{k+1}*T_k$, except for k=1. The results show a complexity decrease of approximately by a factor three to five, depending on the number of antennas.

TABLE 1

COMPARISON OF THE AVERAGE COMPUTATIONAL COMPLEXITY OF PRIOR ART AND ALGORITHM INTITIALIZATION

| | REAL ADDS | REAL MULTIPL. | TOTAL | IMPROVEMENT |
|---|---|---|---|---|
| 4TX-4RX REDUCE $H_K$ | 831 | 972 | 1803 | — |
| 4TX-4RX REDUCE $H_{K+1}*T_K$ | 262 | 299 | 561 | 3.21 |
| 8TX-8RX REDUCE $H_K$ | 4817 | 5626 | 10443 | — |
| 8TX-8RX REDUCE $H_{K+1}*T_K$ | 1016 | 1092 | 2108 | 4.95 |

Implementation of the algorithm initialization aspect of the invention is straightforward to apply, for any lattice reduction algorithm. First, calculate the initialization channel matrix $H'_{k+1}=H_{k+1}*T_k$ for the current channel realization, then apply the lattice reduction algorithm to the initialization channel matrix $H'_{k+1}$. The lattice reduction outputs the change of basis matrix $T'_{k+1}$ for the current channel realization or time instant. Then, the overall change of basis matrix is calculated as $T'_{k+1}=T_k*T'_{k+1}$. After these steps, the prior art lattice reduction based MIMO detection methods can be used with $H'_{k+1}*T_{k+1}$ and $T'_{k+1}$.

While additional matrix multiplications are needed to calculate the initialization channel matrix $H'_{k+1}=H_{k+1}*T_k$ and the overall change of basis matrix $T'_{k+1}=T_k*T_{k+1}$, lattice reduction complexity is reduced by approximately a factor of three to five for four and eight antenna systems. For channels with four or more transmit and receive antennas, the decrease of lattice reduction complexity is substantially more than the additional complexity due to the additional matrix multiplications necessary to implement the algorithm initialization aspect of the invention, as shown in Table 1. While fewer than four or eight antennas will yield lesser net gains in computational savings, it is still seen that a net savings will accrue. Additionally, initializing the algorithm is expected to nearly always reduce errors that may arise from less-than-full convergence of the algorithm when the maximum number of iterations limit is used in conjunction with the initialization aspect of the invention.

Figure 6B:
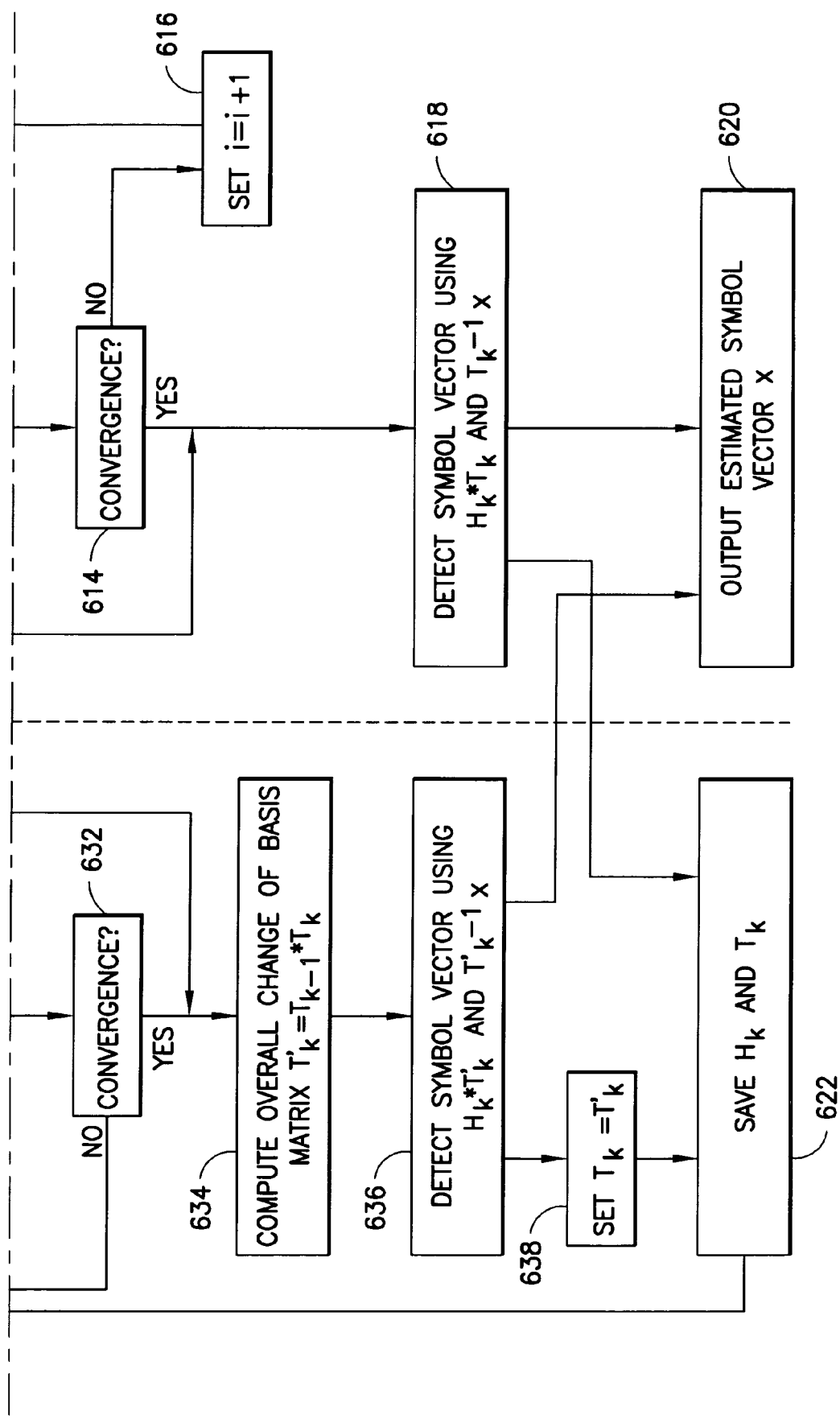
FIG. 6 is a process flow diagram illustrating steps in executing an exemplary embodiment of the present invention.

FIG. 6 illustrates in process diagram form the combined aspects of the invention detailed above. At initiation of a communication session, the current time instant/channel realization k is set to zero at block 602. The current channel matrix $H_k$ is determined at block 604, and an iterative algorithm is then employed to find the change of basis matrix $T_k$ that, when multiplied with the channel matrix $H_k$ will yield a matrix $H_k*T_k$ that is more orthogonal than the channel matrix $H_k$. For a first iteration of the algorithm, the index i is set to one at block 606. If there is no history with this channel/communication session, then the right side of FIG. 6 is followed where k=0 at block 608 and the lattice reduction is not initialized (left and right sides of FIG. 6 are separated by a dotted line). An interim change of basis matrix T is computed at block 610 for the $i^{th}$ iteration of the LLL algorithm, and the current index i is checked at block 612 against the register that stores the maximum value for the number of allowed iterations of the algorithm. If no, then at block 614 the interim change of basis matrix T for the $i^{th}$ iteration is checked against the previous iteration for the interim change of basis matrix T to determine if there has been convergence, (as in FIG. 4). If convergence is not attained, then at block 616 the index i is increased and the loop of blocks 610, 612 and 614 are repeated. At some point after a number of iterations, either the change of basis matrix $T_k$ will have converged on its previous value or a maximum number of iterations will be reached, in which case the symbol vector x is detected at block 618 by zero forcing, minimum mean square error, serial interference cancellation, or other techniques known in the art. At block 620, the estimated symbol vector x is output, and at block 622 the values for the current ($k^{th}$) $H_k$ and $T_k$ are stored.

The next channel realization (e.g., another sub-channel or the same sub-channel at a next time instant) is represented at block 624 by increasing the index k. This increase in k renders the stored values $H_k$ and $T_k$ as now being $H_{k-1}$ and $T_{k-1}$, since the current channel realization is k in FIG. 6 (note that this differs from the k+1 convention used in text above). For the current channel realization k, the channel matrix $H_k$ is determined at block 604 again, the index i is reset to zero at block 606, but k is no longer zero at block 608 so the left side of FIG. 6 is entered. Rather than brute force calculating the interim change of basis matrix T for the first iteration of the algorithm as in block 610, at block 626 the initialization channel matrix $H'_k$ is determined as $H_k$ (from block 604) and $T_{k-1}$ (from block 622). The i=1 first iteration of the algorithm is then run using the initialization channel matrix $H'_k$ to arrive at an interim change of basis matrix T at block 628. As with the right side of FIG. 6, then the algorithm iteration index i is checked against the maximum at block 630 and convergence is checked at block 632. If no to both, the iteration index i is increased at block 633 and the loop of blocks 628, 630, and 632 is repeated. If yes to either of blocks 630 or 632, then at block 636 is computed the overall change of basis matrix $T'_k$ from the previous change of basis matrix $T_{k-1}$ (from block 622) and the current change of basis matrix $T_k$ (from the most recent iteration of block 628). The symbol vector x is detected at block 636 using $H_k$ and $T'_k$ from blocks 604 and 634, respectively. The estimated symbol vector x is output at block 620, the stored change of basis matrix $T_k$ is replaced with the matrix $T'_k$ computed in block 634, and the matrices $H_k$ and $T_k$ for the current $k^{th}$ channel realization are saved in memory at block 622 for use in deriving the change of basis matrix for the next channel realization. This may continue to start each subsequent channel realization at block 624, each time replacing the stored values of $H_k$ and $T_k$ with the next current values to keep the change of basis matrix from diverging too much from the current channel realization as time and channel conditions progress.

Figure 3:
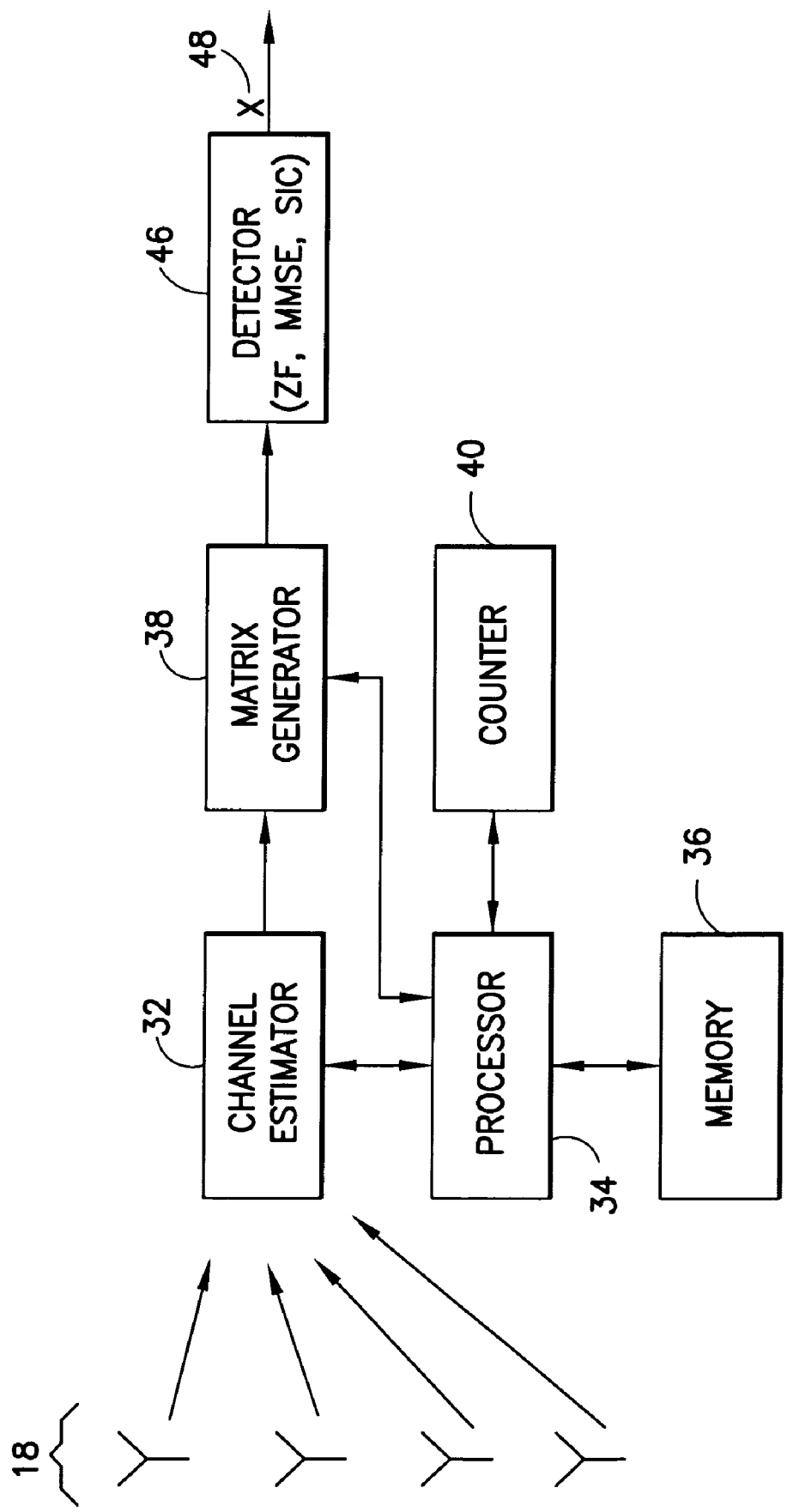
FIG. 3 is a schematic diagram of a transceiver device according to an embodiment of the invention.

FIG. 3 illustrates a schematic diagram of a transceiver such as a base transceiver station BTS or a mobile station MS in which the invention may be embodied. The invention may be disposed in any host computing device. A MS is a handheld portable device that is capable of wirelessly accessing a communication network, such as a mobile telephony network of BTS's that are coupled to a publicly switched telephone network. A cellular telephone, a portable email device, and a personal digital assistant (PDA) with Internet or other two-way communication capability are examples of a MS 32. A portable wireless device includes mobile stations as well as additional handheld devices such as walkie talkies and devices that may access only local networks such as a wireless localized area network (WLAN) or a WIFI network.

The component blocks illustrated in FIG. 3 are functional and the functions described below may or may not be performed by a single physical entity as described with reference to FIG. 3. While not illustrated, there may also be a graphical display screen and display driver, and a user input mechanism (e.g., keypad, microphone, joystick) and input driver for interfacing with a user, a battery if the device of claim 3 is portable.

In the device 30 of FIG. 3, a signal is received at a plurality of receive antennas 18, which have outputs coupled to inputs (or one input) of a channel estimator 32 which estimates the channel matrix H in conjunction with a processor 34 and memory 36. Within the processor 34 are functions such as digital sampling, decimation, interpolation, encoding and decoding, modulating and demodulating such as by QAM, encrypting and decrypting, spreading and despreading (for a CDMA compatible device), and additional signal processing functions known in the art. Computer programs such as algorithms to modulate, encode and decode, data arrays such as look-up tables, and the like are stored in a computer readable storage media 36 which may be an electronic, optical, or magnetic memory storage media as is known in the art for storing computer readable instructions and programs and data. The memory 36 is typically partitioned into volatile and non-volatile portions, and is commonly dispersed among different storage units, some of which may be removable.

An output of the channel estimator 32 is coupled to an input of a basis matrix generator 38, which iteratively applies an algorithm as noted above and stored in memory as computer executable instructions to resolve the change of basis matrix T. A register or counter 40 keeps a current value of the iterative index i as detailed in FIG. 6 so as to upwardly bound a number of iterations the matrix generator 38 performs on a single channel realization. The processor controls all these functions and accesses, reads, compares, and replaces stored values as detailed with respect to FIG. 6. Feedback from the matrix generator 38 to the channel estimator 32 is through the processor 34. Once the matrix generator 38 converges on a solution for T or reaches the maximum number of iterations, it outputs the result to a detector 46, which may be of the zero forcing, MMSE, SIC, or other type, to resolve the transmitted vector x from the matrices H and T as detailed with respect to FIG. 6. Further processing of the detected vector x within the transceiver of the device 30 may then proceed as known in the art.

The embodiments of this invention may be implemented by computer software executable by a data processor of a MS, BTS or other host device, such as the processor 34, or by hardware, or by a combination of software and hardware. Further in this regard it should be noted that the various blocks of the logic flow diagram of FIG. 6 may represent program steps, or interconnected logic circuits, blocks and functions, or a combination of program steps and logic circuits, blocks and functions.

The memory or memories 36 may be of any type suitable to the local technical environment and may be implemented using any suitable data storage technology, such as semiconductor-based memory devices, magnetic memory devices and systems, optical memory devices and systems, fixed memory and removable memory. The data processor(s) 34 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
   receiving at a plurality of antenna ports a signal vector over a plurality of channels;
   at least one processor determining a channel matrix H that represents at least one of the plurality of channels;
   the at least one processor using an iterative algorithm to determine a change of basis matrix T that when multiplied with the channel matrix H converges to a matrix H*T that is more orthogonal than the channel matrix H, wherein the iterative algorithm is upwardly bounded in a number of iterations by a predetermined maximum value; and
   the at least one processor using the channel matrix H and the change of basis matrix T to detect the received signal vector;
   wherein the at least one processor further determines the change of basis matrix T by initializing the iterative algorithm in a first iteration with an initialization channel matrix $H'_k$ that is derived from a current channel matrix $H_k$ and a change of basis matrix $T_{k-1}$ from a previous channel realization.

2. The method of claim 1, wherein the predetermined maximum value is equal to or less than about thirty iterations of the algorithm.

3. The method of claim 1, wherein the iterative algorithm comprises a Lenstra -Lenstra-Lovasz algorithm.

4. A program of machine-readable instructions, tangibly embodied on an information bearing medium and executable by a digital data processor, to perform actions directed toward determining a change of basis matrix T for use in decoding a received signal, the actions comprising:
   receiving a signal vector over a plurality of channels;
   determining a channel matrix H that represents at least one of the plurality of channels; and
   using an iterative algorithm, determining a change of basis matrix T that when multiplied with the channel matrix H converges to a matrix H*T that is more orthogonal than the channel matrix H, wherein the iterative algorithm is upwardly bounded in a number of iterations by a predetermined maximum value,
   wherein the change of basis matrix T is further determined by initializing the iterative algorithm in a first iteration with an initialization channel matrix $H'_k$ that is derived from a current channel matrix $H_k$ and a change of basis matrix $T_{k-1}$ from a previous channel realization.

5. The program of claim 4, wherein the predetermined maximum value is stored on the information bearing medium and is no greater than thirty iterations of the algorithm.

6. The program of claim 4, wherein the iterative algorithm is stored on the information bearing medium and comprises a Lenstra-Lenstra-Lovasz algorithm.

7. An apparatus comprising:
   a plurality of receive antenna ports;
   a channel estimator having an input coupled to an output of each of the plurality of receive antenna ports and an input coupled to a processor and adapted to determine a channel matrix H for a channel realization;
   a matrix generator having an input coupled to an output of the channel estimator and adapted to determine according to an iterative algorithm a change of basis matrix T that when multiplied with the channel matrix H converges to a matrix H*T that is more orthogonal than the channel matrix H;

a register coupled to the matrix generator and adapted to store an upward bound to the number of iterations the algorithm may perform; and a memory adapted to store the iterative algorithm, where the processor terminates further iterations of the algorithm for a current channel realization once the upward bound is reached.

8. The apparatus of claim 7, further wherein the memory is adapted to store a previous change of basis matrix $T_{k-1}$ from a previous channel realization, and the processor initiates a first iteration of the iterative algorithm with a value derived from the previous change of basis matrix $T_{k-1}$.

9. The apparatus of claim 8, wherein the value derived from the previous change of basis matrix $T_{k-1}$ comprises an initialization channel matrix $H'_k$ derived from multiplying a current channel matrix $H_k$ with the previous change of basis matrix $T_{k-1}$.

10. A method for detecting a signal comprising:
receiving at a plurality of antenna ports a signal vector over a plurality of channels;
for a first channel realization, at least one processor determining a first channel matrix $H_1$ that represents at least one of the plurality of channels;
the at least one processor using an iterative algorithm to determine a first change of basis matrix $T_1$ that when multiplied with the first channel matrix $H_1$ converges to a first combined matrix $H_1*T_1$ that is more orthogonal than the first channel matrix $H_1$;
for a second channel realization, the at least one processor determining a second channel matrix $H_2$ that represents at least one of the plurality of channels;
the at least one processor initializing the iterative algorithm with a matrix derived from the first change of basis matrix $T_1$;
the at least one processor using the initialized iterative algorithm to determine a second change of basis matrix $T_2$ that when multiplied with the second channel matrix $H_2$ converges to a second combined matrix $H_2*T_2$ that is more orthogonal than the second channel matrix $H_2$; and
the at least one processor using the second channel matrix $H_2$ and the second change of basis matrix $T_2$ to detect a signal received in the second channel realization.

11. The method of claim 10, wherein the iterative algorithm is upwardly bounded in a number of iterations by a predetermined maximum value.

12. The method of claim 10, wherein the iterative algorithm comprises a Lenstra -Lenstra-Lovasz algorithm.

13. The method of claim 10, wherein the matrix derived from the first change of basis matrix $T_1$ comprises an initiating channel matrix $H'_2$ such that $H'_2=H_2*T_1$.

14. A program of machine-readable instructions, tangibly embodied on an information bearing medium and executable by a digital data processor, to perform actions directed toward determining a change of basis matrix T for use in decoding a received signal, the actions comprising:

receiving a signal vector over a plurality of channels;
for a first channel realization, determining a first channel matrix $H_1$ that represents at least one of the plurality of channels;
using an iterative algorithm, determining a first change of basis matrix T1 that when multiplied with the first channel matrix $H_1$ converges to a first combined matrix $H_1*T_1$ that is more orthogonal than the first channel matrix $H_1$;
for a second channel realization, determining a second channel matrix $H_2$ that represents at least one of the plurality of channels;
initializing the iterative algorithm with a matrix derived from the first change of basis matrix $T_1$;
using the initialized iterative algorithm, determining a second change of basis matrix $T_2$ that when multiplied with the second channel matrix $H_2$ converges to a second combined matrix $H_2*T_2$ that is more orthogonal than the second channel matrix $H_2$; and
using the second channel matrix $H_2$ and the second change of basis matrix $T_2$ to detect a signal received in the second channel realization.

15. The program of claim 14, wherein the iterative algorithm is upwardly bounded in a number of iterations by a predetermined maximum value.

16. The program of claim 14, wherein the iterative algorithm comprises a Lenstra -Lenstra-Lovasz algorithm.

17. The program of claim 14, wherein the matrix derived from the first change of basis matrix $T_1$ comprises an initiating channel matrix $H'_2$ such that $H'_2=H_2*T_1$.

18. An apparatus comprising:
a plurality of receive antenna ports;
a channel estimator having an input coupled to an output of each of the plurality of receive antenna ports and an input coupled to a processor and adapted to determine a first channel matrix $H_1$ for a first channel realization and a second channel matrix $H_2$ for a second channel realization;
a matrix generator having an input coupled to an output of the channel estimator and adapted to determine according to an iterative algorithm a first change of basis matrix $T_1$ for a first channel realization that when multiplied with the first channel matrix $H_1$ converges to a first combined matrix $H_1*T_1$ that is more orthogonal than the first channel matrix $H_1$, and adapted to determine, according to the iterative algorithm initialized with a matrix deriving from the first change of basis matrix $T_1$, a second change of basis matrix $T_2$ for the second channel realization that when multiplied with the second channel matrix $H_2$ converges to a second combined matrix $H_2*T_2$ that is more orthogonal than the second channel matrix $H_2$.

* * * * *

UNITED STATES PATENT AND TRADEMARK OFFICE
CERTIFICATE OF CORRECTION

PATENT NO. : 7,668,268 B2　　　　　　　　　　　　　　　　　　　　　　　　　Page 1 of 1
APPLICATION NO. : 11/439040
DATED : February 23, 2010
INVENTOR(S) : Heiskala It is certified that error appears in the above-identified patent and that said Letters Patent is hereby corrected as shown below:

Col. 13, line 18 delete "for detecting a signal" in between method and comprising.

Col. 14, line 6 delete "T1" and insert --$T_1$--.

Signed and Sealed this

Twentieth Day of April, 2010

David J. Kappos
*Director of the United States Patent and Trademark Office*